(12) United States Patent
Uchida

(10) Patent No.: US 8,208,448 B2
(45) Date of Patent: Jun. 26, 2012

(54) DEDICATED CHANNEL ENTRY METHOD

(75) Inventor: Minoru Uchida, Yokohama (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 672 days.

(21) Appl. No.: 12/363,029

(22) Filed: Jan. 30, 2009

(65) Prior Publication Data

US 2009/0196264 A1 Aug. 6, 2009

(30) Foreign Application Priority Data

Feb. 1, 2008 (JP) ................................. 2008-022660

(51) Int. Cl.
*H04B 7/212* (2006.01)

(52) U.S. Cl. ........................................ 370/337; 370/347

(58) Field of Classification Search .......... 370/329–334, 370/337, 347, 436–439, 453–457, 461; 455/432.1–444, 450–454, 509–515
See application file for complete search history.

(56) References Cited

U.S. PATENT DOCUMENTS

| | | | | |
|---|---|---|---|---|
| 5,978,366 | A * | 11/1999 | Massingill et al. | 370/337 |
| 6,970,438 | B2 * | 11/2005 | Mate et al. | 370/329 |
| 7,113,496 | B2 * | 9/2006 | Koo et al. | 370/335 |
| 7,944,905 | B2 * | 5/2011 | Joshi et al. | 370/347 |
| 2003/0119452 | A1 * | 6/2003 | Kim et al. | 455/69 |
| 2004/0235472 | A1 * | 11/2004 | Fujishima et al. | 455/434 |
| 2005/0135296 | A1 | 6/2005 | Yoshida et al. | 370/328 |
| 2006/0189272 | A1 * | 8/2006 | Willenegger et al. | 455/3.01 |
| 2008/0316961 | A1 * | 12/2008 | Bertrand et al. | 370/329 |

FOREIGN PATENT DOCUMENTS

| | | |
|---|---|---|
| CN | 1620183 | 5/2005 |
| JP | 2005-176336 | 5/2005 |
| JP | 2007-067562 | 3/2007 |

* cited by examiner

*Primary Examiner* — Thai Hoang
(74) *Attorney, Agent, or Firm* — Brundidge & Stanger, P.C.

(57) ABSTRACT

A dedicated channel entry method for a system of digital wireless communications utilizing time division multiplex access and including a base station for voice transmission with wired connection to a command console for voice input/output and with wireless connection to a plurality of mobile station, including the steps of: executing a first communication procedure for selecting an arbitrary mobile station, a second communication procedure for entry to a dedicated channel, and a third communication procedure for transmitting voices at said command station, respectively from the command console relative to the mobile station; and executing said communication procedures in a desired command to allow the designated mobile station to realize automatic entry to the dedicated channel and receive voices from the command console transmitted via the dedicated channel.

7 Claims, 8 Drawing Sheets

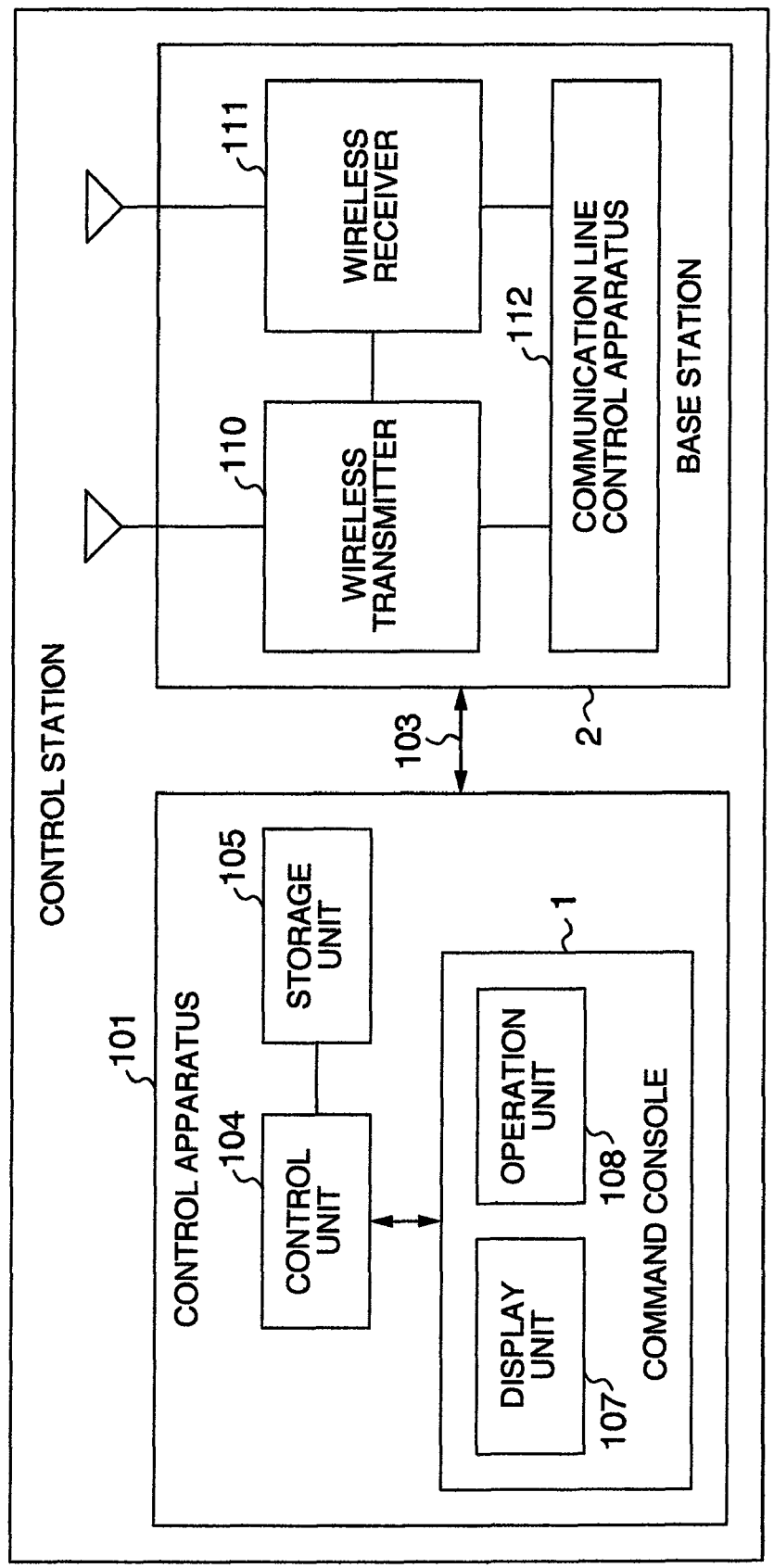

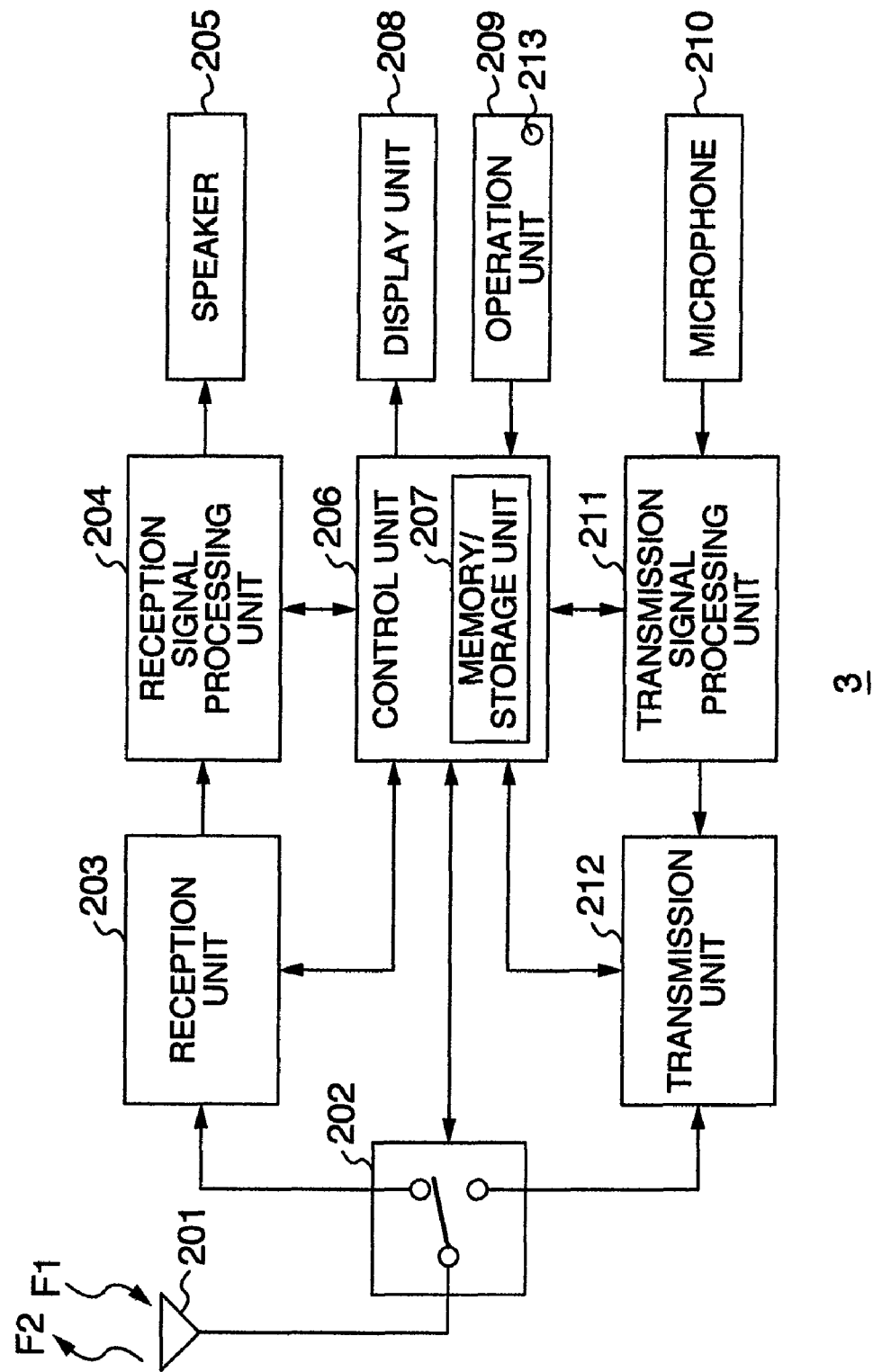

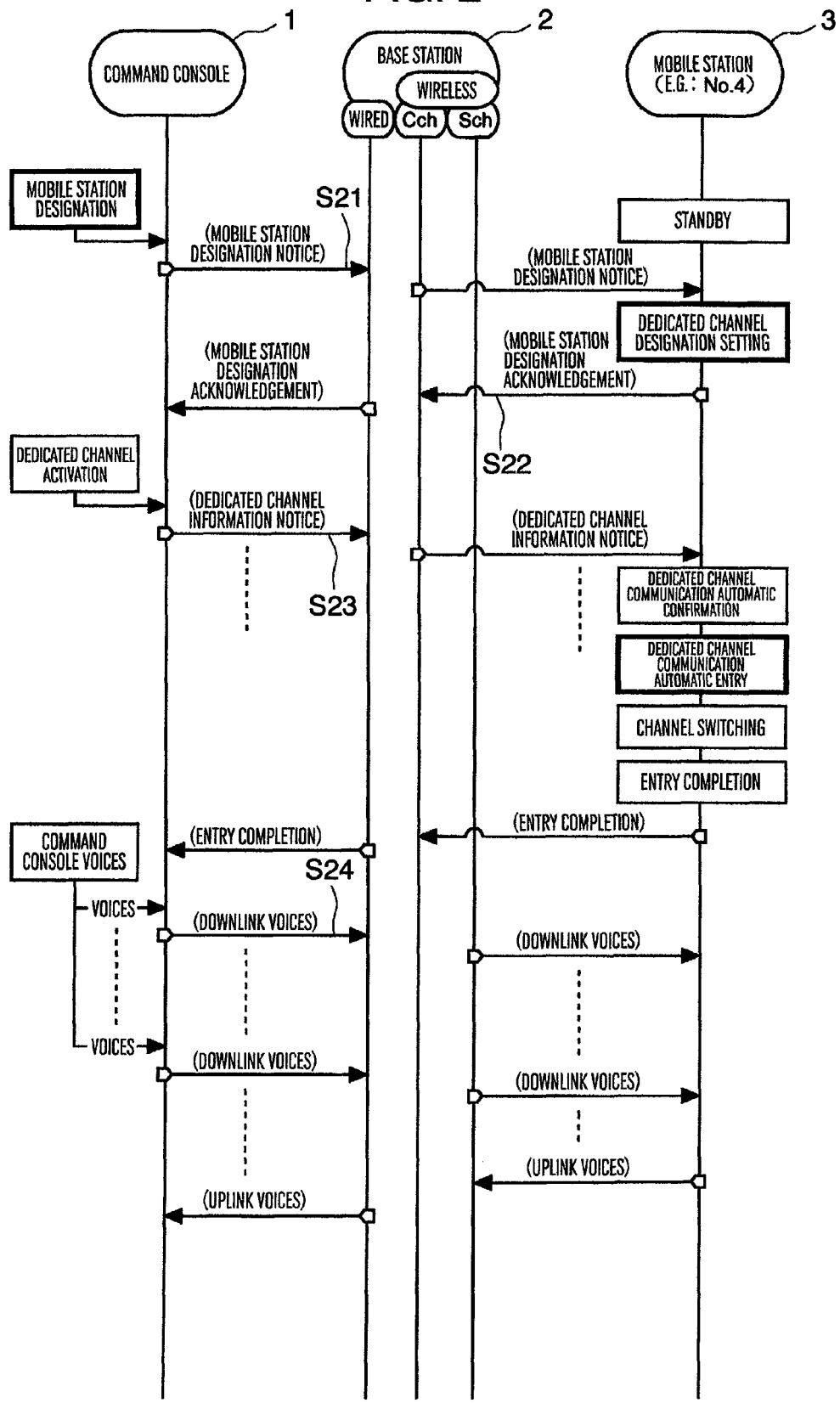

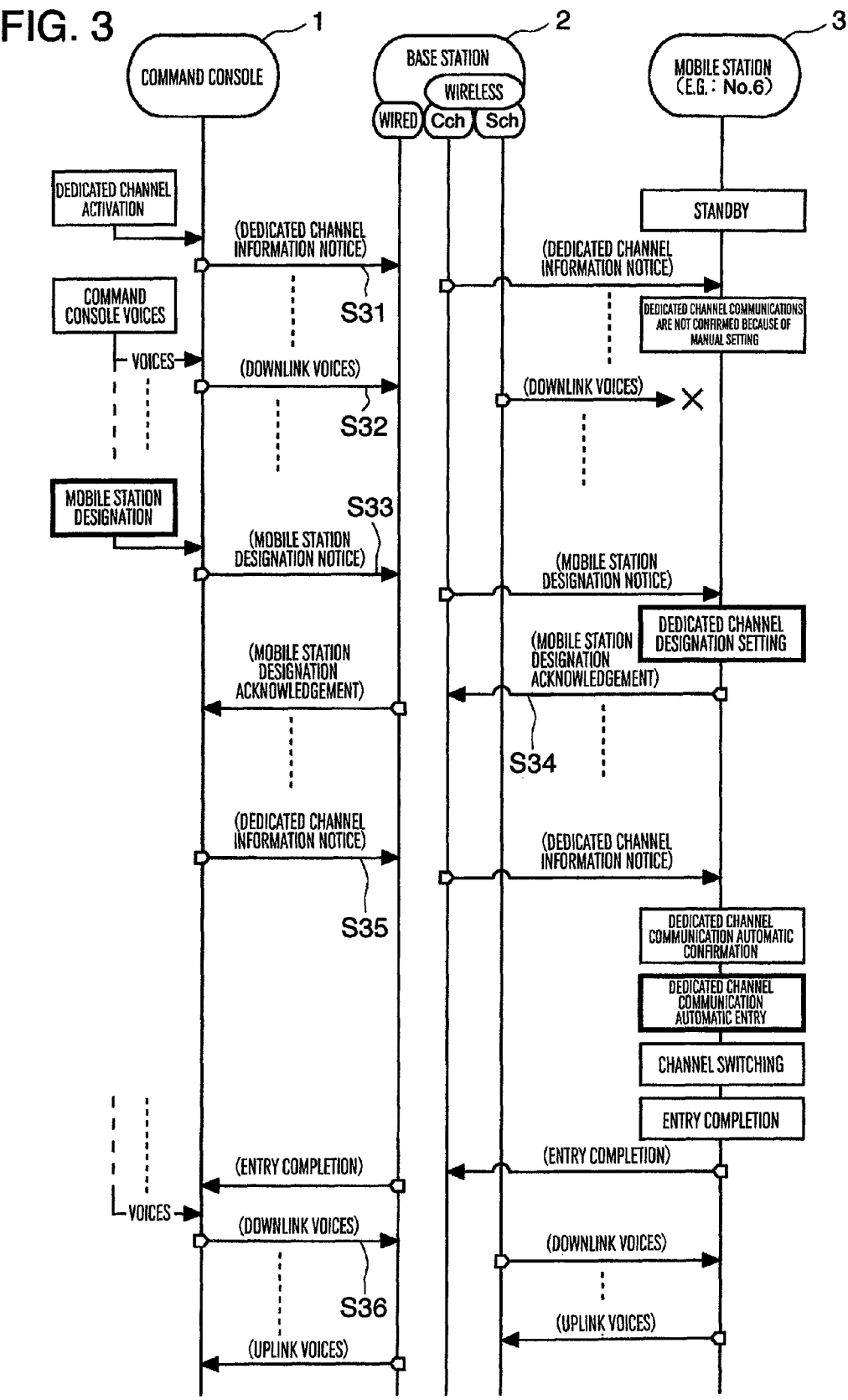

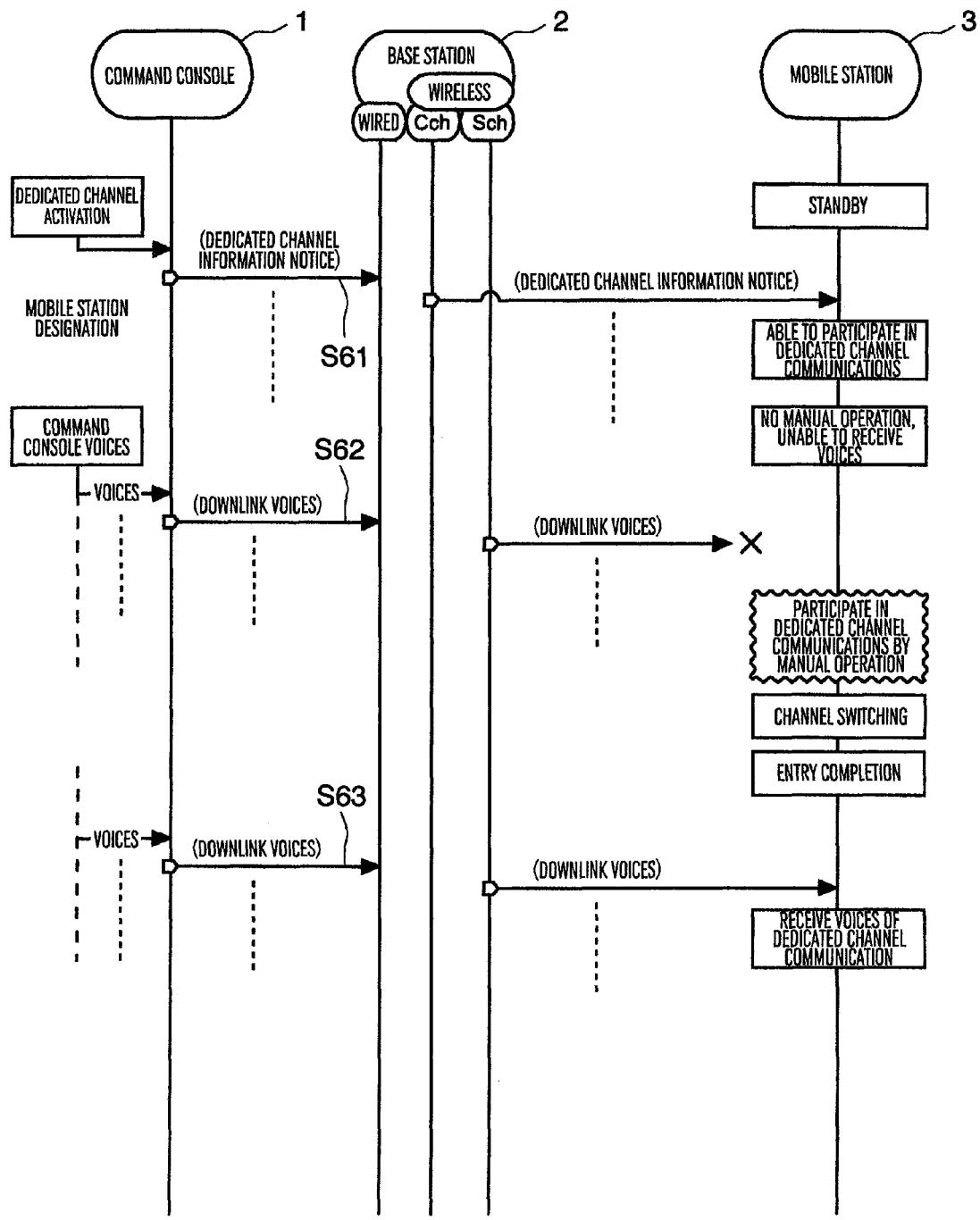

DEDICATED CHANNEL ENTRY METHOD

INCORPORATION BY REFERENCE

The present application claims priority from Japanese Application JP2008-022660 filed on Feb. 1, 2008, the content of which is hereby incorporated by reference into this application.

BACKGROUND OF THE INVENTION

The present invention relates to digital wireless communication utilizing time division multiplex access, and more particularly to a dedicated channel entry method suitable for use with a setting procedure for a dedicated channel assigned to a slot.

Disaster preventing administrative wireless systems are now prevailing as preferential communication networks during disasters. In such systems, particularly in local disaster preventing wireless systems for municipal governments, digitalization has progressed and these systems have been reinforced as a means for rapid and controlled command communications.

Conventional techniques will be described with reference to FIG. 1A which illustrates an embodiment of the present invention including the portion same as conventional techniques. FIG. 1A illustrates an example of the structure of a local disaster preventing wireless digital system for municipal governments, mainly applied to mobile communications.

This system has a base station zone to be used by a control station constituted of a control apparatus 101 (including a command console 1) and wireless devices of a base station 2, and by mobile stations 3 constituted of mobile wireless devices such as mobile wireless apparatus and vehicle mounted wireless apparatus. For example, for an urgent notice during disasters, a command regarding safety information issued from the command console 1 is transmitted to mobile stations 3.

Time division multiple access (TDMA) is one of the systems realizing multiple access in which a plurality of mobile stations 3 share the same frequency band. A plurality of divided times (slots) are assigned to communication channels (Sch) and control channels (Cch). For communications, communication information is loaded in the communication channel, and control information is loaded in the control channel.

In some cases, a channel is selected from communication channels constituted of a plurality of slots, and is used as a dedicated channel to be used dedicatedly. This dedicated channel is assigned dedicatedly to administrative authorities as a communication line aiming at a particular use, for example, for an urgent command during disasters.

Conventionally, an entry to a dedicated channel has been made manually as a preparatory process of receiving voices of an urgent command.

FIG. 6 is a status transition diagram illustrating a conventional communication setting method for a manual entry to dedicated channel communications. Description will be made on the outline of a communication procedure among a command console 1, a base station 2 and a mobile station 3.

The command console 1 loads a communication channel number (slot number) to be designated as a dedicated channel on a control channel (Cch), and transmits the number to mobile stations 3, as a dedicated channel communication notice (S61).

The mobile station side can therefore enter a state allowing an entry to the dedicated channel. However, a selection right of the dedicated channel allowing an entry depends on a manual operation at the mobile station. In the state that the dedicated channel whose communication partner is the command console 1 is not selected, downlink voices (S62) issued from the command console 1 cannot be received (heard).

When the mobile station 3 enters the state that the dedicated channel whose communication partner is the command console 1 is manually selected, i.e., "the state of an entry to the dedicated channel communication by manual operation", "channel switching" is performed from a normal control channel to the dedicated communication channel (dedicated channel) to establish "entry completion" to the dedicated channel, and downlink voices (S63) issued from the command console 1 can be received (heard).

With this arrangement, however, knowing whether the dedicated channel is being set in an urgent case necessary for communications is fully entrusted to judgment by an operator (or user) of each mobile station. Therefore, some mobile stations stand by for reception of the dedicated channel, and other mobile stations do not stand by for reception of the dedicated channel. There arises therefore a problem of inferior rapidness of command communications and low control reliability, such as that mobile stations desired to be participated in dedicated channel communications cannot participate.

A method of switching between general speech and dedicated speech has been proposed in which a mobile station in a general speech state set to the communication channel of general speech individually calls another mobile station in a dedicated channel communication state to perform communications by general speech. For example, refer to JP-A-2007-67562.

SUMMARY OF THE INVENTION

According to conventional techniques, if an operator or user of a mobile station does not grasp the setup state of a dedicated channel for urgent communications, i.e., if an operator or user of a mobile station does not confirm individually presence/absence of settings of a dedicated channel, presence/absence of settings of a dedicated channel cannot be known and the operator or user cannot participate in the dedicated channel communications.

An object of the present invention is to solve the problems of the above-described conventional techniques and provide a dedicated channel entry method capable of reliably performing transmission or reception or both transmission and reception of voices and the like from a command console when dedicated channel communications are to be established.

In order to achieve the above object, the present invention provides a dedicated channel entry method for a system of digital wireless communications including a base station for voice transmission or the like with wired connection or the like to a command console for input/output a signal such as voices and with wireless connection or the like to a plurality of mobile station, comprising steps of:

executing a first communication procedure for selecting an arbitrary mobile station, a second communication procedure for entry to a dedicated channel, and a third communication procedure for transmitting voices at the command station, respectively from the command console relative to the mobile station; and executing the communication procedures in a desired command to allow the designated mobile station to realize automatic entry to the dedicated channel and receive and/or transmit voices or the like via the dedicated channel at the command console.

According to the present invention, it is possible to reduce the number of mobile stations as much as possible which cannot participate in dedicated channel communications and cannot receive important information under operation of the whole system. Accordingly, accidental things can be avoided such as expansion of adverse affects of disasters to be caused by disconnection or delay of important information.

A wireless communication system of the present invention uses a mobile station such as mobile wireless apparatus and vehicle mounted wireless apparatus unnecessary for power lines for device operations. Accordingly, the system becomes an information transmission system which is very fast, controllable and reliable even during electric power failure due to troubles such as power line disconnection by disasters.

Other objects, features and advantages of the invention will become apparent from the following description of the embodiments of the invention taken in conjunction with the accompanying drawings.

BRIEF DESCRIPTION OF THE DRAWINGS

FIG. 1B is a block diagram of a control station.
FIG. 1C is a block diagram of a mobile station.
FIG. 2 is a status transition diagram illustrating a communication setting method of designating a mobile station and then activating a dedicated channel.
FIG. 3 is a status transition diagram illustrating a communication setting method of activating a dedicated channel and then designating a mobile station.
FIG. 6 is a status transition diagram illustrating a communication setting method for a manual entry to dedicated channel communications according to conventional techniques.

DETAILED DESCRIPTION OF THE EMBODIMENTS

Figure 1A:
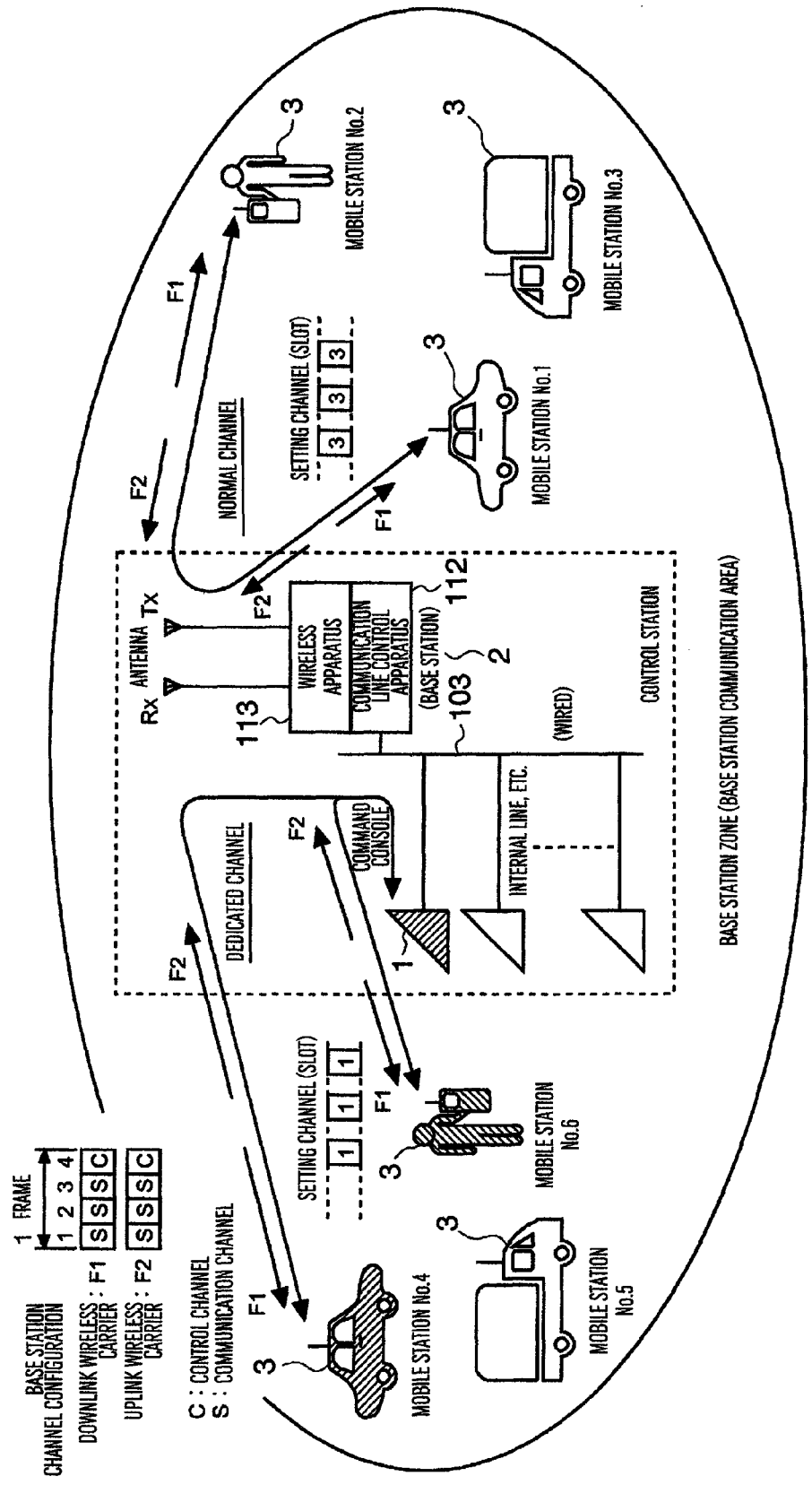
FIG. 1A is a diagram illustrating the configuration of a wireless communication system.

An embodiment of the present invention will be described.
FIG. 1A is a diagram illustrating the structure of a wireless communication system embodying a digital mobile wireless communication system for municipal governments using time division multiple access. Description will now be made in the following.

This wireless communication system has a base station zone (also called a base station communication area, or a communication zone) to be used by a control station constituted of a control apparatus 101 (including a command console 1) and wireless devices of a base station 2, and by mobile stations 3 constituted of mobile wireless devices such as mobile wireless apparatus and vehicle mounted wireless apparatus. For example, an urgent notice during disasters or the like is transmitted via the base station 2 to mobile stations 3 as command information issued from the command console 1.

The base station 2 is constituted of antennas for high frequency wireless communications with the mobile stations 3, a wireless apparatus 113 for high frequency amplification operation, and a communication line control apparatus 112 for controlling wireless and wired lines.

The command console 1 is connected to the communication line control apparatus by a wired line, performs an operation of designating an arbitrary mobile station, and is an apparatus for input/output of command voices. Internal lines, communication tables and the like connected by wired lines may be provided as communication partners.

The base station 2 having the command console 1 and internal lines (including communication tables) connected by wired lines constitutes the control station for controlling command information.

In a speech service area of the base station 2, a plurality of mobile wireless terminal devices such as mobile wireless apparatus, vehicle mount wireless apparatus, portable wireless apparatus, fixed wireless apparatus and semi-fixed wireless apparatus exist as mobile stations 3 (No. 1 to No. 6), and the base station zone is constituted of the mobile stations 3 and control station.

FIG. 1B is a block diagram illustrating a control station according to an embodiment of the invention.

In FIG. 1B, the control station of the embodiment is constituted of the control apparatus 101 (including the command console 1) and the base station 2, and the control apparatus 101 including the command console 1 and the base station 2 are connected by a wired transmission line 103. The control apparatus 101 including the command console 1 and the base station 2 may be structured integrally or discretely. Although it is common that a plurality of base stations 2 are provided, only one representative base station is illustrated in FIG. 1B in order to simplify the description. The control apparatus 101 has a control unit 104, a storage unit 105 and the command console 1. The command console 1 is constituted of a display unit 107 and an operation unit 108. The base station 2 is constituted of a wireless transmitter 110 and a wireless receiver 111 (these correspond to the wireless apparatus 113 in FIG. 1A) for transmission/reception relative to the mobile stations 3, and the communication line control apparatus 112. Although not definitely illustrated in FIG. 1B, the control apparatus 101 (command console 1) and wireless apparatus 113 are connected via the communication line control apparatus 112. In FIG. 1, although the communication line control apparatus 112 is disposed inside the base station 2, the communication line control apparatus may be disposed discretely relative to the base station 2.

The base station 2 is constituted of the wireless transmitter 110 for transmitting a signal from the base station 2 to the mobile station 3 by using, for example, a wireless carrier F1, and the wireless receiver 111 for receiving a signal from the mobile station 3 by using, for example, a wireless carrier F2. The command console 1 performs communication connections among the base station 102 and one or a plurality of mobile stations 3 in the digital wireless system, maintenance and management of the service area, call control from mobile stations, communication route setting control and the like.

FIG. 1C is a block diagram illustrating a mobile station according to the embodiment of the invention. The mobile station herein used is intended to include vehicle mount wireless apparatus mounted on a vehicle or the like, portable wireless apparatus, information terminal stations and the like. In FIG. 1C, the mobile station 3 is represented by a wireless communication apparatus capable of transmission/reception at the same time by using a pair of waves, e.g., an uplink wireless carrier F2 and a downlink wireless carrier F1. The mobile station 3 is a representative one among a plurality of mobile stations (mobile stations No. 1, No. 2, ... ). In FIG. 1C, reference numeral 201 represents an antenna for transmission/reception relative to the base station 2, reference numeral 202 represents a turnover switch for transmission/ reception relative to the base station 2, reference numeral 203 represents a reception unit, reference numeral 204 represents a reception signal processing unit, reference numeral 205 represents a speaker, reference numeral 206 represents a control unit, reference numeral 207 represents a memory/storage unit, reference numeral 208 represents a display unit, reference numeral 209 represents an operation unit, reference numeral 210 represents a microphone, reference numeral 211 represents a transmission signal processing unit, and reference numeral 212 represents a transmission unit. Reference numeral 213 represents a dedicated channel entry button.

Description of the embodiment continues by reverting to FIG. 1A. The channel configuration used as wireless communication lines between the base station 2 and mobile station 3 is as follows. Assigned carriers include a downlink wireless carrier (radio frequency: F1) and an uplink wireless carrier (radio frequency: F2). Each mobile station 3 shares these radio frequencies.

A TDMA timing of each carrier is set having the configuration of four slots per frame. In both carriers F1 and F2, the first to third slots are assigned to communication channels (S or Sch), and the fourth slot is assigned to a control channel (C or Cch).

Communication channel assignment may be set, for example, in such a manner that the communication channel (S) of the first slot among the communication channels of the first to third slots is assigned to a dedicated channel and the remaining communication channels of the second and third slots are assigned to normal communication channels.

Four slots may be assigned to S and C in an arbitrary way.

Next, description will be made on a flow of line connection with reference to FIG. 1A.

First, the command console 1 performs an operation for dedicated channel activation in order to issue a command notice. With this operation, dedicated channel information is recognized at the base station 2 through wired transmission.

The base station 2 selects a communication channel settable for dedicated channel communications, by judging from the running state of each communication channel. The selected communication channel is set as the dedicated channel.

In the example illustrated in FIG. 1A, the first slot of the communication channels (S) is set to the dedicated channel. In this case, the mobile station 3 subordinate to the base station can recognize from transmission of command information from the command console 1 (higher hierarchical apparatus) that the dedicated channel is set to the first slot.

A designated mobile station 3 in a standby state (power-on: receiving mode) enters the state that automatic entry control to dedicated channel communications is allowed.

Next, an operator or user of a mobile station, e.g., the mobile station 3 (No. 4), to which automatic entry to the dedicated channel is allowed recognizes that it is possible to participate in the dedicated channel communications and to perform command speech (speech transmission, speech reception or both) of the command console 1, because the dedicated channel was activated and automatically entered.

Description will be made hereunder on the communication procedures of the embodiments, with reference to FIGS. 2 to 5.

FIG. 2 is a status transition diagram of a communication setting method of designating a mobile station and thereafter activating a dedicated channel, according to the first embodiment of the present invention. Description will be made on a communication procedure for automatic entry to dedicated channel communications of the first embodiment.

This communication procedure is an example of the procedure executed in accordance with standard operations that the command console 1 first designates one or a plurality of mobile stations 3, and thereafter the designated mobile station 2 is made to activate the dedicated channel.

A first communication procedure of the first embodiment is as follows.

Prior to executing a control command operation for activating dedicated channel communications, the command console 1 (on the infrastructure side) performs a "mobile station designation" operation for designating an arbitrary mobile station. Sent in this "mobile station designation" operation are a signal representative of setting a mobile station 3 (e.g., No. 4) to be made to automatically enter the dedicated channel or setting a dedicated channel release to the mobile station already set to the dedicated channel and desired not to enter the dedicated communications, and a mobile station designation notice (S21) constituted of a terminal number of a notice target and a dedicated channel number. This notice information is transmitted to the mobile station 3 (No. 4) in the standby state via the wired line and the wireless line (Cch: control channel=fourth slot).

Upon reception of the designation notice, the mobile station 3 (No. 4) enters a "dedicated channel designation setting" state. Namely, the mobile station 3 (No. 4) stores the dedicated channel number contained in the designation notice, and thereafter returns a mobile station designation acknowledgement (S22), as confirmation return information of acknowledgement, to the command console 1 via the wireless line (Cch) and wired line. At this stage, the mobile station 3 (No. 4) enters a preparatory state for automatic recognition of the dedicated channel activation.

A second communication procedure is as follows.

The command console 1 recognizes the mobile station designation acknowledgement information, and thereafter performs a "dedicated channel activation" operation.

Then, a dedicated channel information notice (S23) constituted of the dedicated channel number, frequencies (carriers) and slot numbers is transmitted to the mobile station 3 (No. 4) in the dedicated channel designation setting state via the wired line and wireless line (Cch).

Upon reception of the dedicated channel information notice, the mobile station 3 (No. 4) compares the dedicated channel number stored in the first communication procedure with the dedicated channel number contained in the presently received dedicated channel information notice, and if both the numbers are coincident, sequentially executes a series of processing operations (automatic confirmation of dedicated channel communications, automatic entry to dedicated channel communications, channel switching, and entry completion). In this manner, the dedicated channel is activated, and the mobile station 3 (No. 4) enters an automatic recognition and automatic entry state.

A third communication procedure is as follows.

Voices uttered from the command console 1 are transmitted as downlink voices to the mobile station 3 (No. 4) in a voice reception state via the wired line and the wireless line (Sch: communication channel=first slot=dedicated channel slot), and the mobile station 3 (No. 4) recognizes command voices. The voice reception state may be a state capable of transmission of voices or a state capable of transmission/reception of signals other than voices.

In summary, in the order of the above-described communication procedures, the command console 1 designates first a mobile station, and then makes the designated mobile station set the dedicated channel and receive command speech. With these communication procedures, the command console 1 transmits the mobile station designation notice and dedicated channel setting information notice to the mobile station 3 (No. 4) via the control channel C (fourth slot) of the downlink carrier F1, the first slot of the communication channels S is assigned to the dedicated channel to set the dedicated channel and the like, the designated mobile station participates in the dedicated channel, and command voices are transmitted via the dedicated channel of the first slot.

According to the command console of the invention, it is possible to grasp the dedicated channel entry state of mobile stations standing by in the base station zone and designate a desired mobile station in accordance with the dedicated channel entry state.

Although dedicated channel entry by the mobile stations can be automated, manual entry as in the conventional case is also possible.

FIG. 3 is a status transition diagram of a communication setting method of activating a dedicated channel and thereafter designating a mobile station, according to the second embodiment of the present invention. Description will be made on a communication procedure of the second embodiment.

First, the command console 1 performs a "dedicated channel activation" operation to transmit a dedicated channel information notice (S31) to the mobile station 3 (e.g., No. 6) in a standby state via the wired line and wireless line (Cch) (corresponding to the second communication procedure).

Then, the command console 1 transmits downlink voices (S32) (corresponding to the third communication procedure).

However, at this stage, the mobile station 3 (No. 6) is in a state that "dedicated channel communications are not confirmed because of manual setting", as a dedicated channel manual setting standby state as in a conventional case.

This state is a state that command voices cannot be received, because preparation (dedicated channel entry) for receiving voices uttered at the command console 1 is not completed (refer to an x symbol for downlink voices (S32)).

According to the invention, in order to allow an arbitrary mobile station 3 to have automatic entry to dedicated channel communications, the command console 1 performs a "mobile station designation" operation to send a mobile station designation notice (S33) to, for example, a mobile station 3 (No. 6). This notice information is transmitted to the mobile station 3 (No. 6) in the standby state via a wired line and wireless line (Cch).

Upon reception of the mobile station designation notice, the mobile station 3 (No. 6) performs a "dedicated channel designation setting" operation, i.e., a "dedicated channel entry preparation" operation.

Next, after the dedicated channel designation setting, a mobile station designation acknowledgement (S34) as confirmation return information of acknowledgement, is returned to the command console 1 via the wireless line (Cch) and wired line. The mobile station 3 (No. 6) enters therefore a state that dedicated channel communication activation can be automatically recognized. The command console 1 enters a state that the "mobile station designation acknowledgement" information can be confirmed. (Corresponding to the first communication procedure).

Upon reception of a dedicated channel information notice (S35) transmitted from the command console 1 after S31, the mobile station 3 (No. 6) becomes possible to recognize the dedicated channel information notice and perform a predetermined procedure (automatic confirmation of dedicated channel communications, automatic entry to dedicated channel communications, channel switching, and entry completion), to thereafter execute the predetermined procedure.

In this manner, the dedicated channel is activated, and the mobile station 3 (No. 6) enters an automatic recognition and automatic entry state. (Corresponding to the second communication procedure).

Voices uttered again at the command console 1 are sent as downlink voices (S36) to the mobile station 3 (No. 6) in the voice reception state via the wired line and wireless line (Sch), and recognized as command voices. (Corresponding to the third communication procedure at the second time). In this case, voices may be transmitted or signals other than voices may be transmitted/received.

In this manner, the state that downlink voices (S32) cannot be received at the mobile station 3 (No. 6) is changed to the state that voices can be received automatically. This is a countermeasure (execution of the dedicated channel automatic entry) for avoiding the case in which the downlink voices (S62) in FIG. 6 illustrating the status transition of conventional techniques cannot be received.

This communication procedure operates also in the following manner.

As illustrated in FIG. 2, it is herein assumed that entry to the dedicated channel is performed in response to the operation of the command console 1 (on the infrastructure side) and the mobile station 3 (e.g., No. 4) receives voices from the command console 1. In this state, the command console 1 sends the mobile station designation notice (S33) to another mobile station 3 (e.g., No. 6) desired to be additionally participated in the dedicated channel communications. The mobile station 3 (No. 6) receives the mobile station designation notice, returns the mobile station designation acknowledgement (S34), and enters the state that the dedicated channel communication activation can be recognized automatically. The mobile station 3 receives the dedicated channel information notice (S35) again transmitted after S31, performs a predetermined procedure for automatic recognition, automatic entry, channel switching, entry completion and transmission/reception of voices and the like. In this manner, a communication procedure for adding a mobile station.

In the embodiment described above, a mobile station can be designated after the dedicated channel is activated. Namely, a mobile station desired to be participated in the dedicated channel can be set again when necessary, even if the mobile station desired to be participated in the dedicated channel has a turned-off power because of failure, maintenance or the like, even if communications are impossible because the mobile station is outside the communication area of the base station, or even if the mobile station desired to be participated in the dedicated channel is designated erroneously.

Figure 4:
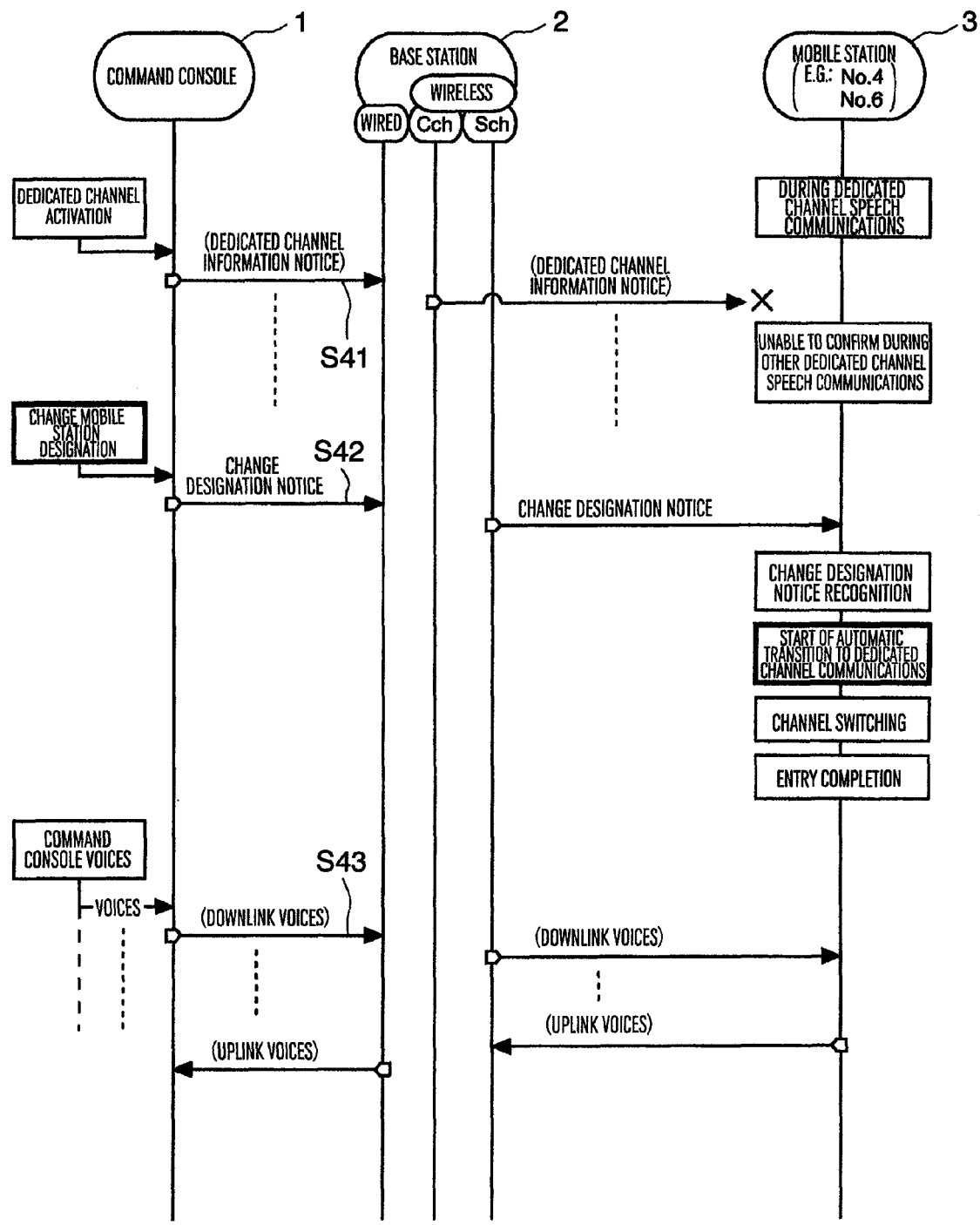
FIG. 4 is a status transition diagram illustrating a communication setting method of setting communications by switching to another dedicated channel.

FIG. 4 is a status transition diagram of a communication setting method of switching to speech communications by another dedicated channel during speech communications by a dedicated channel, according to the third embodiment of the present invention. Description will be made on a communication procedure of the third embodiment.

The third embodiment describes a method of moving mobile stations 3 (No. 4 and No. 6) already participating in communications on a dedicated channel (using the first slot) to communications on another dedicated channel (new dedicated channel: e.g., the second slot).

If a dedicated channel information notice (S41) indicating a new slot is loaded in (Cch) and transmitted to a mobile station in a state that (Cch) cannot be received, i.e., in a state "during dedicated channel speech communications" by (Sch), automatic switching to a new dedicated channel and entry completion are impossible. (Dedicated channel information notice: x symbol "another dedicated channel cannot be confirmed during speech communications") (Corresponding to a portion of the second communication procedure).

In order to realize automatic entry to another dedicated channel, a communication procedure corresponding to mobile station designation is executed.

Namely, using the communication channel (first slot: Sch) which is a currently active dedicated channel (used by the mobile channel for communications), the command console 1 executes a "change mobile station designation" operation to transmit a change designation notice (S42) constituted of a type signal representative of a change notice, a number (ID: Identity Document) of the mobile station to be changed, and a dedicated channel number at a change destination.

Upon reception of this notice, the mobile stations 3 (No. 4 and No. 6) can execute a predetermined procedure (change designation notice confirmation, start of automatic transition to dedicated channel communications, channel switching, and entry completion) (corresponding to the latter halves of the first and second communication procedures).

In this manner, the communication channel (first slot: Sch) as the currently active dedicated channel can be switched to the communication channel (e.g., the second slot: Sch) as the new dedicated channel, and the mobile stations 3 can receive downlink voices S43 uttered at the command console. (Corresponding to the third communication procedure). In this case, the mobile station may transmit voices or transmit/receive signals other than voices.

In summary, the command console 1 (on the infrastructure side) selects a mobile station already participating in the dedicated channel communications, loads the change designation notice and information on the communication channel to be used as a new dedicated channel, on the active dedicated channel, and transmits the notice and information. According to this communication procedure, upon reception of the change designation notice, the mobile station can immediately switch to the newly designated dedicated channel communications.

In the embodiment described above, the mobile station already participating in communications (dedicated channel communications) is switched to other dedicated channel communications. In this case, the mobile station to be switched is under communications by Sch so that Cch cannot be used. This is the reason why the "change designation notice" is transmitted by Sch. In this case, depending upon the type of speech, a response is not possible in some cases. It is therefore unnecessary to return "acknowledgement" information for the change designation notice.

In the embodiment described above, there exist a plurality of dedicated channels. Each dedicated channel may be provided with a priority command. For example, if a received change designation notice is a notice of entry to a dedicated channel having a priority command higher than that of the dedicated channel presently used for communications, the mobile station may accept this instruction.

Figure 5:
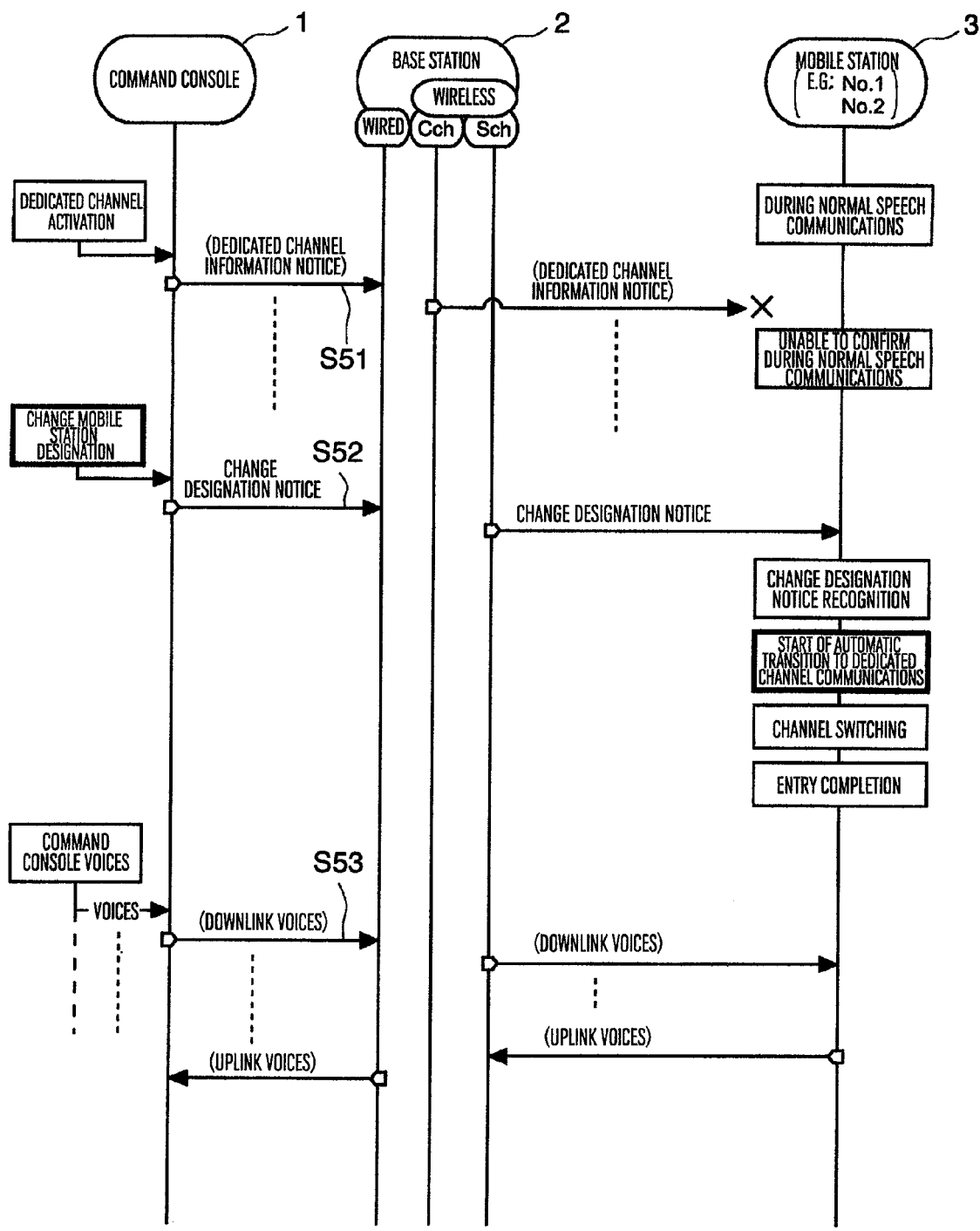
FIG. 5 is a status transition diagram illustrating a communication setting method of setting communications by switching to a dedicated channel during normal speech communications.

FIG. 5 is a status transition diagram of a communication setting method of switching to speech communications by a dedicated channel during speech communications by a normal communication channel, according to the fourth embodiment of the present invention. Description will be made on a communication procedure of the fourth embodiment.

The fourth embodiment describes a method of moving mobile stations 3 (No. 1 and No. 2) under communications by a normal (usual) communication channel to the dedicated channel communications (dedicated channel: e.g., first slot) with emergency priority.

In this case, if the command console 1 performs the "dedicated channel activation" operation and merely sends a dedicated channel information notice (S51), the mobile station cannot automatically switch to the dedicated channel and realize entry completion. Namely, since the mobile station is in a state of "during normal speech communications", the mobile station cannot enter dedicated channel entry preparation. (Dedicated channel information notice: x symbol).

This is because (Cch) cannot be received during speech communication on (Sch), i.e., "notice from the command console cannot be recognized during normal speech communications". (Corresponding to a portion of the second communication procedure).

In order to automatically perform dedicated channel entry, a communication procedure corresponding to the mobile station designation is executed similar to the case illustrated in FIG. 4.

The command console 1 performs a "change mobile station designation" operation and transmits a change designation notice (S52) by using the communication channel (third slot: Sch) which is the presently active normal communication channel. Upon reception of the change designation notice, the mobile stations 3 (No. 1 and No. 2) can execute a predetermined procedure (change designation notice acknowledgement, start of dedicated channel communication automatic transition, channel switching, entry completion).

By executing the predetermined procedure, the presently active normal communication channel (third slot: Sch) is switched to the communication channel (e.g., first slot: Sch) as the dedicated channel, and downlink voices or the like (S53) issued from the command console 1 can be received at the mobile stations 3 (No. 1 and No. 2). (Corresponding to the first to third shortened type communication procedures).

In summary, the command console 1 (on the infrastructure side) selects a mobile station already performing normal communication channel communications, transmits the change designation notice, loads information on a communication channel to be used as a dedicated channel, in the active normal communication channel, and sends the information. According to this communication procedure, the mobile station can be switched to the designated dedicated channel communications immediately after the change designation notice is received.

In this embodiment, the mobile station already performing speech communications (normal communication channel communications) is switched to the dedicated channel communications. In this case, the mobile station to be switched is under communications by Sch so that Cch cannot be received. The "change designation notice" is therefore transmitted by Sch. Depending upon the type of speech, a response cannot be made in some cases so that "acknowledge" information for the change designation notice is not required to be returned.

In the embodiment described above, after the mobile station 3 during normal communications is forcibly switched to the dedicated channel, the communication link of the already established normal communications is disconnected (immediately or after a lapse of a predetermined time) or the normal communications are retained temporarily. Whether the link is disconnected or the normal communications are retained temporarily is determined by a user of the embodiment system.

The command console is an apparatus capable of inputting command voices of a user having a control right, to perform setting operation (start)/setting release operation (end) for various functions necessary for communication system running.

Ordinary communications involve line settings for transfer of normal (usual) messages among mobile stations, between the command console and mobile station, between an internal line and a mobile station, and the like as illustrated in FIG. 1A. A communication partner is a predetermined individual or group, use of a communication channel is limited to a predetermined area.

In the dedicated channel communications, a communication partner is not limited but all mobile stations in the base zone become targets for commands and information exchange during disasters.

In all embodiments, although the dedicated channel entry of the present invention is automated by communication control, manual entry is also available.

The present invention is applicable to a wireless communication system used for mobile communications, for example, communications in public works or the like.

It should be further understood by those skilled in the art that although the foregoing description has been made on embodiment of the invention, the invention is not limited thereto and various changes and modification may be made without departing from the spirit of the invention and the scope of the appended claims.

The invention claimed is:

1. A dedicated channel entry method for a system of digital wireless communications including a base station for voice transmission with wired connection to a command console for voice input/output and with wireless connection to a plurality of mobile stations, wherein the digital wireless communications use a communication line which includes a communication channel having a plurality of slots and at least one slot of the plurality of slots is allocated as a dedicated channel, the method comprising steps of:
   executing a first communication procedure for selecting an arbitrary mobile station to be entered into the dedicated channel, the selected mobile station is set to a status in which the dedicated channel is selected;
   executing a second communication procedure for receiving a dedicated channel information notice including a dedicated channel number at the selected channel number with a further dedicated channel number set to the selected mobile station in the first communication procedure and if the received dedicated channel number and the further dedicated channel number are matched then the selected mobile station is entered to the dedicated channel so that the dedicated channel is activated to enter the selected mobile station to the dedicated channel;
   executing a third communication procedure for transmitting voices at a command station, respectively from said command console relative to the selected mobile station and receiving the voices at the selected mobile station by using the dedicated channel; and
   executing said communication procedures in a desired command to allow the selected mobile station to enter to said dedicated channel and receive voices from said command console transmitted via said dedicated channel.

2. The dedicated channel entry method according to claim 1, wherein, if the selected mobile station received a notification signal for the dedicated channel, the selected mobile station which received the notification signal is automatically entered into the dedicated channel.

3. The dedicated channel entry method according to claim 1, wherein, if the selected mobile station which is not directed to enter into the dedicated channel is set to a status in which the dedicated channel is selected, the status in which the dedicated channel is selected is released so as not to receive the voices in the dedicated channel.

4. A dedicated channel entry method for a system of digital wireless communications including a base station for voice transmission with wired connection to a command console for voice input/output and with wireless connection to a plurality of mobile station, comprising steps of:
   executing a first communication procedure for selecting an arbitrary mobile station, a second communication procedure for entry to a dedicated channel, and a third communication procedure for transmitting voices at a command station, respectively from said command console relative to said mobile station; and
   executing said communication procedures in a desired command to allow said designated mobile station to realize automatic entry to said dedicated channel and receive voices from said command console transmitted via said dedicated channel,
   wherein if said arbitrary mobile station is under communications with another mobile station, said command console transmits a predetermined signal over a communication channel to execute said second communication procedure.

5. The dedicated channel entry method according to claim 4, wherein if said predetermined signal cannot be transmitted over a control channel to said arbitrary mobile station, said command console transmits said predetermined signal over said communication channel to said arbitrary mobile station.

6. The dedicated channel entry method according to claim 4, wherein if said arbitrary mobile station desired to be entered into said dedicated channel is under speech communications with said other mobile station over another dedicated channel, said second communication procedure is executed.

7. A system of digital wireless communications having a dedicated channel wherein the digital wireless communications uses a communication line which include a communication channel having a plurality of slots and at least one slot of the plurality of slots is allocated as a dedicated channel, the system comprising:
   a plurality of mobile stations;
   a command console for executing a first communication procedure for selecting an arbitrary mobile station, to be entered into the dedicated channel, from said plurality of mobile stations and the selected mobile station being set to a status in which the dedicated channel is selected, a second communication procedure for receiving a dedicated channel information notice including a dedicated channel number at the mobile station and comparing the received dedicated channel number with a further dedicated channel number of the dedicated channel set to the mobile station in the first communication procedure and if the received dedicated channel number and the further dedicated channel number are matched then the mobile station is entered to the dedicated channel so that the dedicated channel is activate to enter the mobile station into said dedicated channel, and a third communication procedure for transmitting a signal on the dedicated channel to said arbitrary station, in a desired command;
   a base station for relaying communications between said command console and said plurality of mobile stations;
   a first communication line for communications between said command console and said base station; and
   a second communication line for communications between said plurality of mobile stations and said base station, wherein said first to third communication procedures are executed in the desired command to allow said arbitrary mobile station to enter to said dedicated channel and to allow said arbitrary mobile station and said command console to establish a communication route over said dedicated channel.

* * * * *